May 30, 1933.  W. D. PHETEPLACE ET AL  1,911,769
LIQUID TREATING APPARATUS
Filed Feb. 2, 1932  2 Sheets-Sheet 1
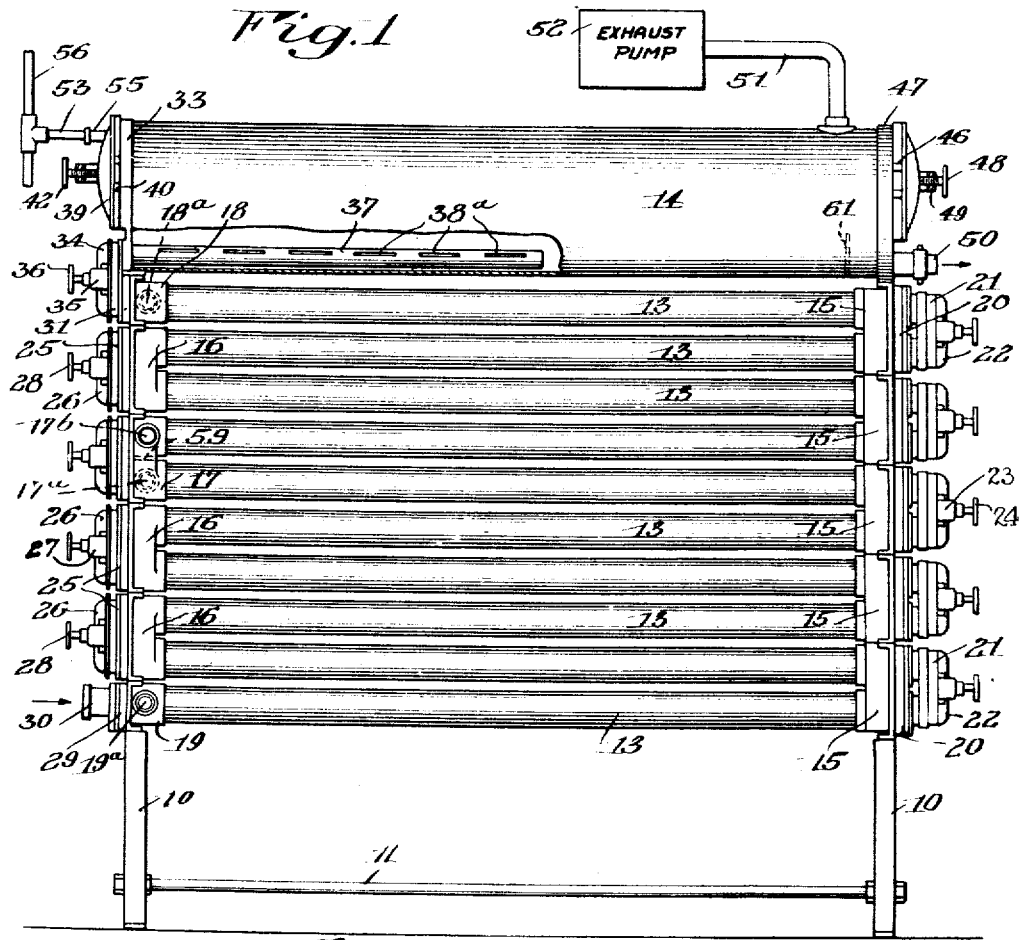
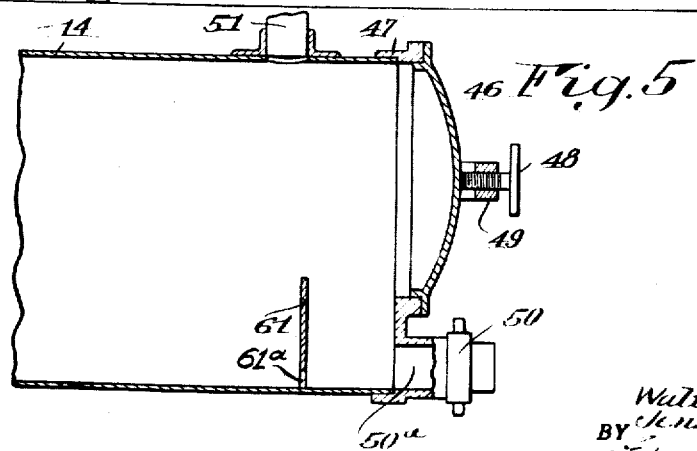
INVENTORS
Walter D. Pheteplace
Jens N. Jacobsen
BY
THEIR ATTORNEY

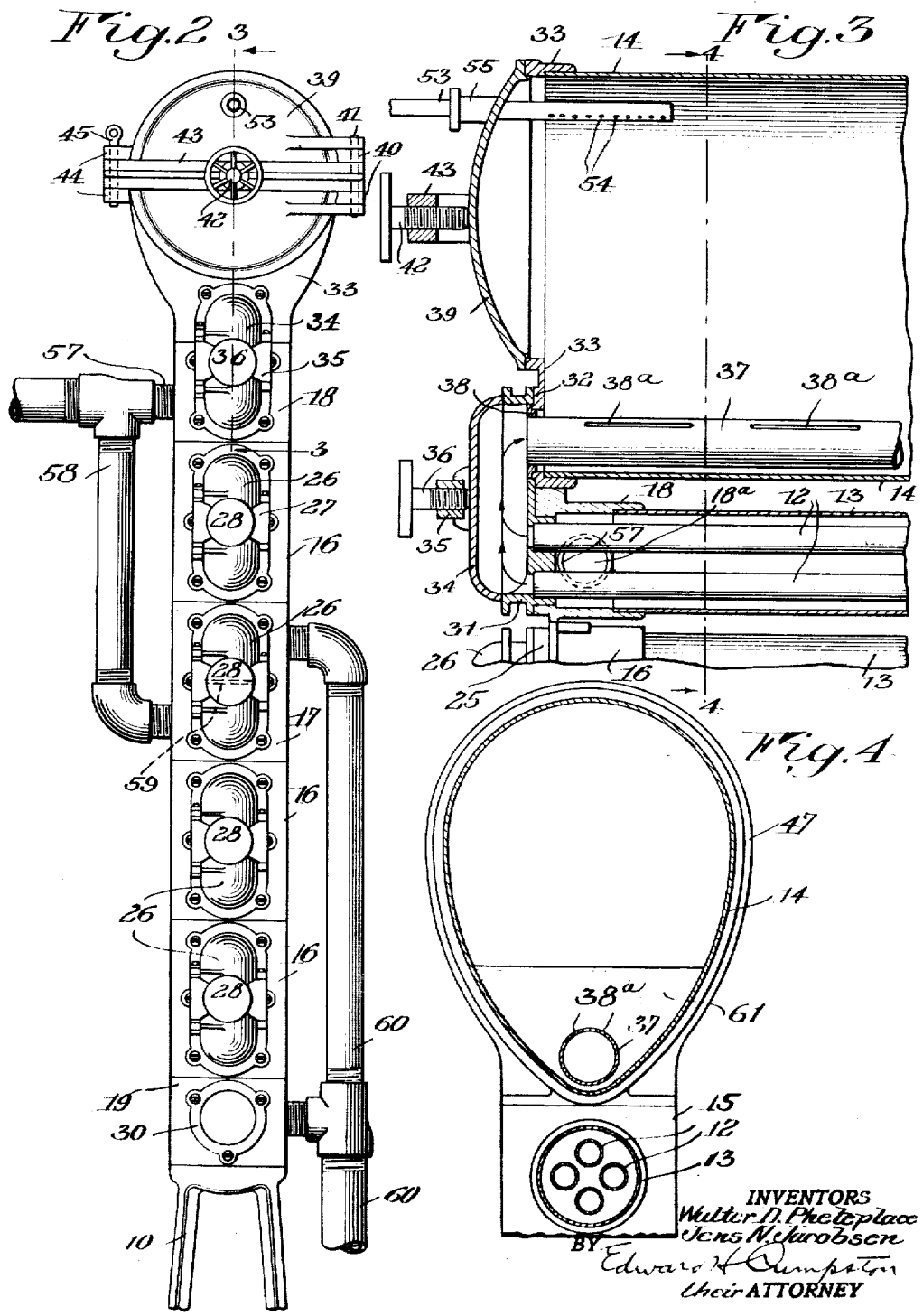

Patented May 30, 1933

1,911,769

UNITED STATES PATENT OFFICE

WALTER D. PHETEPLACE AND JENS N. JACOBSEN, OF ROCHESTER, NEW YORK, ASSIGNORS TO THE PFANDLER CO., OF ROCHESTER, NEW YORK, A CORPORATION OF NEW YORK

LIQUID TREATING APPARATUS

Application filed February 2, 1932. Serial No. 590,420.

The present invention relates to liquid treating apparatus and has for its object to provide a compact, efficient, and economical form of construction for the treatment of various liquids or liquid food products and in which the treating or conditioning operations can be rapidly and effectively performed in a satisfactory manner.

A further object of the invention is to provide improved liquid treating apparatus comprising a unitary construction arranged for heating or cooling the liquid while circulating it through a closed system whereby it is treated in the absence of oxygen to avoid the possibility of oxidation which might result from exposing the liquid to the atmosphere.

A further object of the invention is to provide an improved heat exchange unit for heating or cooling the liquid in conjunction with means for subjecting the liquid such, for example, as milk and the like, to subnormal pressure while circulating within the unit in order to facilitate the removal of the objectionable gases or volatile constituents from the liquid.

A further object of the invention is to provide an improved unitary construction arranged for treating and removing from liquids such, for example, as milk, cream, and the like, various objectionable flavors and odors by subjecting it while circulating within the unit to the action of a heating or cooling medium and also to subnormal pressure while in a state of relatively fine subdivision, as well as to the action of steam or other gas to facilitate the liberation and carrying off of the gaseous contents of the liquid.

A further object of the invention is to provide a heat exchange unit for treating liquids which is formed of a plurality of tubular sections and so arranged as to afford a compact and unitary construction, one or more of the sections constituting a chamber or chambers in which to produce a partial vacuum, and also in which steam or other gas can be admitted to more effectively liberate the gaseous and volatile constituents of the liquid in order that the same may be more readily carried off while subjecting the liquid to subnormal pressure within the unit.

To these and other ends of the invention resides in certain improvements and combinations of parts, all as will be hereinafter more fully described, the novel features being pointed out in the claims at the ends of the specification.

In the drawings:

Fig. 1 is a part sectional elevation of apparatus constructed in accordance with the invention;

Fig. 2 is an end elevation of the same drawn to an enlarged scale;

Fig. 3 is an enlarged sectional elevation taken on line 3—3 of Fig. 2;

Fig. 4 is a transverse section taken on line 4—4 of Fig. 3, and

Fig. 5 is a fragmentary section drawn to an enlarged scale and taken longitudinally through the outlet end of the uppermost tubular section of the heating unit shown in Fig. 1.

The same reference numerals throughout the several views indicate the same parts.

The present invention relates to improved apparatus for treating liquids by the heating or cooling method, as for example, by subjecting them to the influence of a circulating heating or cooling medium for raising or lowering the temperature of the liquid as desired. The present construction comprises a compact unitary arrangement of parts for the circulation of the liquid and the heating or cooling medium, together with means for producing a partial vacuum within the unit in order to subject the liquid to subnormal pressure for the purpose of de-aerating the liquid and effecting removal of certain objectionable gases or volatile constituents therefrom while treating the same. Means is also provided for admitting steam or other gas to the vacuum chamber to facilitate the liberation and carrying off of the gases.

While the apparatus is well adapted for the treatment of various liquids and liquid food products it is particularly adapted for treating and removing from milk and cream various objectionable flavors and odors, such for example, as occur in the milk as the result of onions and certain weeds and the like upon which the cows feed from time to time, and it is especially adapted for use in treating or processing liquids in the manner described and claimed in an application bearing Serial No. 587,986, filed January 21, 1932, in the name of Jens N. Jacobsen, one of the present applicants.

The present apparatus is adapted not only for the continuous circulation of the liquid while under subnormal pressure for the purpose of heating and removing from the liquid the objectionable gases and volatile constituents thereof, but also circulation of the preheated liquid and the subjection of the same to subnormal pressure while being cooled, to further remove therefrom any remaining objectionable gases or volatile constitutents therein. Furthermore, the liquid, either while being heated or cooled, is circulated in a closed system in the absence of oxygen in order to avoid the possibility of oxidation which would result from the exposure of the liquid to the atmosphere.

Referring to the drawings, 10 represents a pair of standards connected by one or more tie rods 11, the standards forming a base or support for the heat exchange unit shown in Fig. 1. The unit is made up of a plurality of tubular sections mounted one upon another to provide an extremely compact arrangement, requiring a minimum amount of space and affording economy in the installation and operation of the unit. While the sections are shown superimposed one upon another it will be understood that they may be otherwise grouped if desired to afford a compact unit, through which the liquid to be treated and the heating or cooling medium can both be circulated by any suitable means, not shown.

The unitary apparatus shown in Fig. 1 includes the inner and outer liquid circulating tubes 12 and 13 and the somewhat larger tube or receptacle 14, which affords a chamber in which to produce a partial vacuum by means described hereinafter.

As shown in Fig. 4 a number of the milk or liquid circulating tubes 12 are grouped within each of the larger tubes 13, through which latter the heating or cooling fluid is circulated. The tubes 13 are fitted at one end into heads 15 superimposed one upon another as shown at the right of Fig. 1, while at the left of said figure, similar heads 16 are shown in which the tubes 13 are inserted. The tube receiving heads have openings formed therein, not shown, through which the heating or cooling fluid passes from one tube to another. The intermediate head 17 is similar to the heads 16, but is provided with openings 17a and 18a for the reception of certain of the fluid inlet and outlet pipes, described hereinafter. For the upper and lower tubes 13 of the unit the heads at the left of Fig. 1, are of the single type as indicated at 18 and 19, respectively, and these are provided with openings 18a and 19a for the reception of certain of the fluid inlet and outlet pipes as subsequently described.

The heads 15 are provided with manifolds 20 which receive the ends of the liquid circulating tubes 12 and which are provided with return bends or connections 21 having covers 22 hinged thereon and clamped in position by yokes 23 which are also hinged to the connections and which carry clamping screws 24 for urging the covers upon the seats of the connections.

At the opposite end of the heating unit the heads 16 and 17, which receive the ends of the tubes 13, are provided with manifolds 25 for receiving the ends of the liquid circulating tubes 12, said manifolds having covers 26 hinged thereon and clamped in position by means of yokes 27 also hinged to the manifolds and carrying screws 28 for clamping the covers upon the manifolds.

The single head 19 at the bottom of the heat exchange unit is provided with a manifold 29 for receiving the ends of the tubes 12 within the lower tube 13. The manifold 29 is preferably bolted to the head 19 and carries an extension 30 arranged to receive a supply connection, such for example as one connected with a milk or liquid supply tank, not shown, it being understood that the liquid discharging from the supply tank will enter the heat exchange unit through the manifold 29 and will be discharged from the uppermost tubes 12 through a manifold 31, receiving the ends of said tubes 12 as shown in Fig. 3. The manifold 31 has its lower end seated upon and connected with the head 18 and its upper end connected with the projecting portion 32 of a frame or plate member 33 for receiving and supporting one end of the tubular receptable 14 constituting the vacuum chamber of the unit. The manifold 31 has a cover 34 hinged thereon and a yoke 35 is also hinged to the manifold in front of the cover and carries a clamping screw 36 for clamping the cover upon the manifold.

A delivery pipe 37 is extended within the vacuum tube or receptacle 14 and is supported therein by a ring-shaped member 38 fitted within the wall of the manifold 31 in advance of the shoulder 32 on the frame member 33 and preferably seated upon the latter, as shown in Fig. 3. The ring may be held in position by any suitable means, not shown, and together with the pipe 37 is removable for cleaning when desired. It will be understood that the liquid discharging from the tubes 12 into the manifold 31 will enter the pipe 37 and be delivered into the receptacle 14 in a state of relatively fine subdivision by reason of its spray-like discharge through the narrow slots or ports 38ª of the pipe.

The receptacle is closed at its liquid receiving end by a door 39 hingedly connected to the lugs 40 of the frame 33 by a pivot member 41 and is clamped in closed position upon the frame by means of a screw 42 threaded through a yoke 43 which is also pivoted to swing upon the pivot 41. The opposite end of the yoke is received between spaced lugs 44 on the frame and is secured by a detachable pin 45.

The opposite end of the receptacle is closed by a door 46 hingedly connected to the end frame or plate member 47 of the receptacle, the hinge being similar to that of the door 39. The door 46 is clamped in the closed position shown in Fig. 5 by a screw 48 threaded through a yoke 49 which is also hinged to the frame at one end and secured thereto at the other end by means similar to that shown for supporting the yoke 43 in Fig. 2.

The frame 47 to which the door 46 is hinged is provided with an extension 50 having an opening 50a therein for the discharge of the liquid, the opening being flush with the bottom of the receptacle to insure complete drainage of the liquid therefrom. The extension is arranged for connection with piping for returning the liquid to the supply tank, not shown, but which in conjunction with the heating unit constitutes a closed system for the circulation of the liquid.

The means for maintaining a partial vacuum within the receptacle 14 to subject the liquid therein to subnormal pressure comprises a pipe 51 connected with the receptacle and extending therefrom to any suitable suction producing means, such as that indicated diagrammatically at 52 in Fig. 1.

In the process of continuously circulating the liquid to remove the gases by subjecting the liquid to subnormal pressure, it has been found desirable to employ means to act as an accelerator for the liberation of the gases from the milk or other liquids as well as to maintain the desired temperature in the vacuum chamber during the circulating and vacuumizing period. This may be done by maintaining a current of steam or other gas in contact with the liquid. To this end, there is located within the receptacle, any suitable means such as a pipe 53 provided with a plurality of perforations 54 for discharging a multiplicity of jets of steam within the receptacle while subjecting the liquid therein to subnormal pressure, whereby to more rapidly liberate the gases in order that they may be readily and effectively carried off. The pipe 53 is supported by and extended through a boss or bushing 55 on the cover 39 of the receptacle. The pipe 53 is connected with a supply pipe 56 which may be connected with any suitable source of supply, not shown, of steam or heated gas or vapor which can be controlled by suitable means for regulating the flow and the temperature of the steam or gas as desired.

Furthermore, any suitable means may be provided for circulating the heating or cooling medium through the heat transfer unit. With the present arrangement a supply pipe 57 is connected with the inlet opening 18a of the head 18 for discharging the heating or cooling liquid to the uppermost tube 13, within which the liquid circulating tubes 12 are disposed, Fig. 3. The pipe 57 is provided with a short connection 58 which communicates with the opening 17a of the head 17 so that the heating or cooling liquid may enter the heat transfer unit at different points and at substantially the same temperature in order to maintain a more uniform temperature for the liquid in the different parts of the unit. The heating or cooling liquid circulating through the upper and lower portions of the unit is separated by providing a partition 59 in the center of the head 17, as shown by dotted lines in Fig. 2. The liquid circulating through the upper portion of the heat exchange unit is discharged through the opening 17b in the head 17 and that circulating through the lower portion of the unit is discharged through the opening 19a in the single head 19 at the bottom of the unit. A discharge pipe 60 for carrying off the liquid is connected with the discharge openings 17b and 19a of the heads 17 and 19, respectively, as indicated in Fig. 2.

It will be understood that the flow of the heating or cooling liquid through the heat transfer unit may be in a reverse direction from that described, but since the milk or other liquid to be treated enters the bottom of the unit and discharges at the top thereof, it is preferred to flow the heating or cooling medium in an opposite direction in order to obtain the best results in the control of the temperature of the liquid to be treated by causing it to enter the unit at a point considerably removed from that at which the heating or cooling medium enters the same.

While the means for forcing the heating or cooling liquid through the heat exchange unit is not shown, it will be understood that any suitable means may be provided to accomplish this result, such for example as a pump, ejector, or other means suitable for the purpose.

Adjacent the discharge end of the receptacle 14, it may be desirable to provide a baffle plate as indicated at 61, in Fig. 5, in order to prevent a direct and too rapid flow of the milk or other liquid to the outlet 50a of the receptacle. In other words, the baffle will serve to delay the discharge of the liquid from the receptacle and thus insure a greater length of time for the vacuum producing means to function in removing or carrying off the gases or volatile constituents from the milk or other liquid circulating through the heat exchange unit. The position of the baffle and the height of the same can be regulated to afford the best results in the flow of the liquid and in the desired level of the same in the receptacle, but it is preferred to so position the baffle that it can be easily reached from the end of the receptacle for the purpose of cleaning the same when desired. In order to insure proper draining of the liquid from the receptacle 14 the baffle is provided with one or more openings 61a at its bottom edge as shown in Fig. 5.

It will be seen from the drawings and particularly from Fig. 3 that the vacuum receptacle 14 constitutes one section of the unit and that it will be heated to a considerable degree by radiation from the underlying sections of the unit through which the heating medium is circulated. The supply of steam admitted to the receptacle for liberating and carrying off the gases from the liquid will also serve to maintain the desired temperature in the vacuum chamber, which can be controlled by regulating means, not shown.

The tubular sections of the unit can be readily cleaned from time to time by swinging the covers on the ends thereof to open position and employing a hose or other means to flush them out with any suitable cleaning liquid or fluid, or by swabbing as desired.

It will be understood that the vacuum chamber in the receptacle 14 will have sufficient height to permit of the separation of the gases from the milk or other liquid without causing the liquid to be withdrawn from the receptacle by the vacuum producing means. On the other hand the partial vacuum will be so regulated as not to result in the overheating or boiling of the milk while circulating through the heating unit. The rate of discharge of the liquid from the receptacle through the outlet 50a may be controlled by regulating the degree of suction produced at the outlet by suitable means associated with the suction producing apparatus, not shown.

The apparatus may be employed in various ways for treating liquids of different kinds, but is particularly adapted for use in the processing operations described and claimed in this application.

In addition to the liquid treating or pasteurizing operations described, the apparatus may also be employed in the neutralizing process for sour cream, in which the neutralizers produce chemical action resulting in the formation of gases. The cream also contains undesirable odors, and the gases and odors are more readily separated from as well as absorbed or taken up by the butter fat in the cream when it is heated. The butter fat oxidizes in contact with air and consequently it is important to apply vacuum, or subject the cream to subnormal pressure when it is being heated or during the neutralizing process, in order to then remove the oxygen and other gases and volatile constituents which cause objectionable flavors and odors, this being accomplished by liberating and carrying off the gases, as can be readily done with the apparatus shown and described.

The heat exchange unit shown in the drawings comprises the tubes 12, 13, and 14 and their connections, which constitute in effect what may be termed a unitary construction, that is, one which though made up of a number of parts, functions as a whole in the operations of heating and cooling the liquid and removing the undesirable flavors and odors therefrom by carrying off of the gases in the manner described. In other words, the liquid circulating through the tubular sections is at one and the same time subjected both to the action of the heating or cooling medium and to that of the means operating to produce subnormal pressure within the unit. With this construction, therefore, the liquid such, for example, as milk, cream, and the like while passing through the unitary structure can be heated to pasteurizing or other temperatures and at the same time subjected to subnormal pressure for the purpose of removing the undesirable gases. The preheated liquid can thereafter be recirculated through the unit and cooled while under subnormal pressure to effect removal of any remaining objectionable gases or volatile constituents therefrom. Furthermore during the operations of circulating or recirculating the milk or other liquid through the unit, it is treated in the absence of oxygen in order to avoid any oxidation which might result from exposing it to the atmosphere. The liquid may also be subjected while within the unit to the action of steam and other gas in order to more effectively remove the undesirable flavors and odors therefrom.

We claim:

1. In liquid treating apparatus, a heat exchange unit arranged for the circulation therethrough of the liquid to be treated and for the simultaneous circulation of a heating or cooling medium for maintaining the circulating liquid at the desired temperature, said unit including a vacuum chamber, means for producing a partial vacuum in the chamber, and means for supplying steam to the chamber to facilitate liberation of the gases from the liquid.

2. In liquid treating apparatus, a heat exchange unit comprising a plurality of communicating sections mounted one upon another and arranged for the circulation of the liquid, a plurality of the sections being also arranged for the circulation of a temperature controlling medium by which to control the temperature of the circulating liquid and one of the sections having a vacuum chamber arranged for connection with means for producing a partial vacuum therein, and means associated with the last mentioned section for subjecting the liquid discharging thereto to a state of relatively fine subdivision.

3. In milk treating apparatus, a heat exchange unit comprising a plurality of closely united tubular sections arranged for the continuous circulation of the milk therethrough, certain of the sections being also arranged for the circulation of a heating or cooling medium therein for maintaining the milk at the desired temperature, means in one of the sections for subjecting the circulating milk to a state of subdivision, means for producing a partial vacuum in the last mentioned section, and means for admitting a supply of steam to said last mentioned section.

4. In liquid treating apparatus, heat exchange means comprising a unitary construction including tubular sections for the circulation of the liquid to be treated and additional sections for the circulation of a heating or cooling medium for the liquid through which a plurality of the first mentioned sections are extended, one of said first mentioned sections forming a vacuum chamber, and means connected with said chamber for producing a partial vacuum therein.

5. In liquid treating apparatus, heat exchange means comprising a unitary construction including tubular sections for the circulation of the liquid to be treated and additional sections for the circulation of a heating or cooling medium for the liquid through which a plurality of the first mentioned sections are extended, one of said first mentioned sections forming a vacuum chamber, means for producing a partial vacuum within said chamber, and means for delivering a supply of steam to said vacuum chamber.

6. In liquid treating apparatus, heat exchange means comprising a unitary construction including tubular sections for the circulation of the liquid to be treated and additional sections for the circulation of a heating or cooling medium for the liquid through which a plurality of the first mentioned sections are extended, one of said first mentioned sections forming a vacuum chamber arranged for connection with means for producing a partial vacuum therein, and means for subjecting the liquid discharging to said chamber to a state of relatively fine subdivision.

7. In liquid treating apparatus, a heat exchange unit comprising a plurality of inner and outer tubular sections, the former being arranged for the circulation of the liquid to be treated and the latter for the circulation therethrough of a heating or cooling medium for the liquid, a receptacle forming a part of the unit, means associated with the receptacle for discharging the liquid thereto in a state of relatively fine subdivision, said means being arranged to receive the liquid discharging from the inner tubular sections, means connected with the receptacle for producing a partial vacuum therein, and means extending within the receptacle for delivering a supply of steam thereto.

8. In liquid treating apparatus, heat exchange means comprising a unitary construction including a plurality of communicating sections for the circulation of a heating or cooling medium, tubular sections for the circulation of the liquid to be treated a plurality of which extend through said first mentioned sections, and manifolds connecting said tubular sections and having releasable covers permitting access to the tubular sections, one of the tubular sections being disposed externally of the first mentioned sections and comprising a vacuum chamber arranged for connection with means for producing a partial vacuum therein.

9. In liquid treating apparatus, heat exchange means comprising a unitary construction including a plurality of sections for the circulation of a heating or cooling medium for the liquid to be treated, said sections having communicating heads for the passage of the heating or cooling medium from one section to another, tubular sections for the circulation of the liquid to be treated a plurality of which extend through said first mentioned sections and the heads thereof, manifolds connecting the ends of said tubular sections one of the latter comprising a vacuum chamber arranged for connection with means for producing a partial vacuum therein, and liquid discharge means extending within the vacuum chamber arranged to discharge the liquid thereto in a state of relatively fine subdivision, said discharge means receiving the liquid from the manifold connecting the tubular section forming the vacuum chamber with another of said tubular sections.

10. In liquid treating apparatus, heat exchange means comprising a unitary construction including a plurality of sections for the circulation of a heating or cooling medium, said sections mounted one upon another and having communicating heads for the passage of the liquid from one section to another, tubular sections for the circulation of the liquid to be treated a plurality of which extend through said first mentioned sections and the heads thereof, a plurality of manifolds certain of which serve each to connect the ends of the tubular sections extended through a plurality of the first mentioned sections, one of said tubular sections being disposed externally of the first mentioned sections and comprising a vacuum chamber arranged for connection with means for producing a partial vacuum therein, a delivery pipe for the liquid to be treated extending within the vacuum chamber and arranged to discharge liquid thereto in a state of relatively fine subdivision, said delivery pipe communicating with one of said manifolds and the latter having an opening normally closed by a releasable cover, said delivery pipe being removable through said opening upon release of the cover.

WALTER D. PHETEPLACE.
JENS N. JACOBSEN.

CERTIFICATE OF CORRECTION.

Patent No. 1,911,769.      May 30, 1933.

WALTER D. PHETEPLACE, ET AL.

It is hereby certified that the name of the assignee in the heading to the printed specification of the above numbered patent, was erroneously written and printed as "The Pfandler Co." whereas said name should have been written and printed as "The Pfaudler Co.", as shown by the records of assignments in this office; and that the said Letters Patent should be read with this correction therein that the same may conform to the record of the case in the Patent Office.

Signed and sealed this 29th day of August, A. D. 1933.

M. J. Moore.
Acting Commissioner of Patents.

(Seal)

ity of which extend through said first mentioned sections and the heads thereof, a plurality of manifolds certain of which serve each to connect the ends of the tubular sections extended through a plurality of the first mentioned sections, one of said tubular sections being disposed externally of the first mentioned sections and comprising a vacuum chamber arranged for connection with means for producing a partial vacuum therein, a delivery pipe for the liquid to be treated extending within the vacuum chamber and arranged to discharge liquid thereto in a state of relatively fine subdivision, said delivery pipe communicating with one of said manifolds and the latter having an opening normally closed by a releasable cover, said delivery pipe being removable through said opening upon release of the cover.

WALTER D. PHETEPLACE.
JENS N. JACOBSEN.

CERTIFICATE OF CORRECTION.

Patent No. 1,911,769.   May 30, 1933.

WALTER D. PHETEPLACE, ET AL.

It is hereby certified that the name of the assignee in the heading to the printed specification of the above numbered patent, was erroneously written and printed as "The Pfandler Co." whereas said name should have been written and printed as "The Pfaudler Co.", as shown by the records of assignments in this office; and that the said Letters Patent should be read with this correction therein that the same may conform to the record of the case in the Patent Office.

Signed and sealed this 29th day of August, A. D. 1933.

M. J. Moore.
Acting Commissioner of Patents.

(Seal)

CERTIFICATE OF CORRECTION.

Patent No. 1,911,769.                                                                                  May 30, 1933.

WALTER D. PHETEPLACE, ET AL.

It is hereby certified that the name of the assignee in the heading to the printed specification of the above numbered patent, was erroneously written and printed as "The Pfandler Co." whereas said name should have been written and printed as "The Pfaudler Co.", as shown by the records of assignments in this office; and that the said Letters Patent should be read with this correction therein that the same may conform to the record of the case in the Patent Office.

Signed and sealed this 29th day of August, A. D. 1933.

M. J. Moore.
(Seal)                                                            Acting Commissioner of Patents.